June 21, 1966   J. C. CUMMING   3,256,962
BRAKE SYSTEM
Filed April 26, 1965                           7 Sheets-Sheet 4

INVENTOR
JAMES C. CUMMING
BY
Strauch, Nolan, Neale,
Nies and Bronaugh
ATTORNEYS

Fig. 7

INVENTOR
JAMES C. CUMMING

BY Strauch, Nolan, Neale,
Nies and Bronaugh
ATTORNEYS

June 21, 1966  J. C. CUMMING  3,256,962
BRAKE SYSTEM

Filed April 26, 1965  7 Sheets-Sheet 6

Fig. 9

INVENTOR
JAMES C. CUMMING

BY Strauch, Nolan, Neale,
Nies and Bronaugh
ATTORNEYS

Fig. 9

INVENTOR
James C. Cumming

BY Strauch, Nolan, Neale,
Nies and Bronaugh
ATTORNEYS

United States Patent Office 3,256,962
Patented June 21, 1966

3,256,962
BRAKE SYSTEM
James Charles Cumming, Pleasant Ridge, Mich., assignor to Rockwell-Standard Corporation, Pittsburgh, Pa., a corporation of Delaware
Filed Apr. 26, 1965, Ser. No. 450,596
8 Claims. (Cl. 188—152)

This application is a continuation-in-part of application Serial No. 241,265, filed November 30, 1962 and now abandoned for Brake System.

The present invention refers to brake mechanisms for automotive vehicles and more particularly to brake systems in which the force to actuate certain of the vehicle brakes is derived solely from torque produced in special brake means disposed within one or more wheels.

Such systems have the advantage that only a fraction of the normal brake applying force is needed to apply all brakes, since only the primary brake or brakes from which all the other brakes are actuated is directly connected by way of the master cylinder to the brake pedal, and a power braking effect is created for the other secondary brakes without the addition of expensive and complicated vacuum or other power boosters as in conventional power brake systems. In effect, the driver need only apply the brakes associated with the wheels which carry the lightest load. Thus, in the case of passenger cars, the driver directly applies only the rear brakes which normally do only about 40% of the braking.

Most prior attempts to provide such a system have depended for operation on the force imparted by a rotating body, usually a pivoted plate or lever mounted for rocking movement in opposite directions and directly or indirectly connected to the brake shoes and adapted to transfer derived torque from the applied primary brake to a power actuator by which the remaining wheel brakes are applied. The motion transfer from the torque lever or plate to the power actuator in such devices is usually accomplished by bell cranks, cam and roller arrangements and like complex linkages and usually a lost motion connection or some equivalent arrangement must be provided at the force transmitting means to assure proper actuation in either direction of rotation.

The foregoing prior devices embody serious disadvantages. Space available in a vehicle wheel is usually very restricted and it is difficult, if not impossible in most cases, to incorporate additional rocking or rotating members, links, levers, cams and the like therein. Furthermore, such constructions are costly to make and pose manufacturing problems in regard to wearing parts. In addition, the added weight in the one wheel must be compensated for by some measures to balance the wheels.

Other prior systems have included self-energizing brakes at all wheels. Actual experience has shown that the use of self-energizing brakes in the secondary system creates a pressure buildup in the secondary circuit which produces uncontrolled braking action usually resulting in full application of all brakes until the brake pedal is released.

Most, if not all, prior systems have failed to preserve the normal brake pedal "feel" which causes loss of operator confidence and seriously interferes with the safe operation of the vehicle.

The present invention provides a power braking system to overcome the foregoing defects of such prior devices.

The power braking system of the present invention is unique in that it may be utilized not only to actuate certain wheels in a four wheeled vehicle but may be advantageously connected in a continuous series, that is, for instance, if the power actuation is derived from, say, the front wheels of a tractor having tandem rear axles, the forward-rear wheel brakes of the tandem assembly may be power actuated by brake shoe torque from the front wheel brakes, and in turn may power actuate the rear-rear wheel brakes of the tandem assembly by brake shoe torque forces derived from the forward rear wheel brakes of the tandem assembly. It will be understood by anyone skilled in the art that this torque derived power will be transferred step by step so that the desired braking power will be available at all brakes including the rear-rear wheel brakes of the tandem. The desired brake output of each brake can be easily controlled by properly determining the volume of the respective wheel cylinders.

In a further arrangement the power actuated rear-rear wheel brakes of such tractor braking system as above described may again be provided with torque reaction output means to successfully power actaute the wheel brakes of an attached trailer. In multi-wheel trailers, similar in-series torque reaction brake application means may be provided. In effect, the numbers of wheel brakes actuated by an in-series torque reaction system according to the present invention is unlimited. This provides for the first time an effective braking system for multi-wheeled vehicles, especially heavy trailer tractors in which the brake output at each pair of wheels may vary and is properly determined by the wheel cylinder sizes, so that the desired brake power is available at each brake. There is no time delay between successive brake application in a multi-wheel in-series installation because the primary brake does not take effect until the shoes in the next brake are seated in the drum and the fluid column is at rest. Road tests prove that brake application in accordance with the present invention is substantially instantaneous at all wheels so no effective time lag exists.

Another advantage of the hydraulic torque reaction power brake system of the present invention is that full braking power is available at all times, even if the engine should stall which would inactivate conventional power brake systems. Furthermore, this novel power brake sytem is fully operable in elevated areas where ordinary vacuum power brake systems fail due to the lower air pressure at high altitudes.

In torque actuated hydraulic braking systems major difficulties have been encountered in maintaining the proper amount of fluid in the secondary or torque actuated system, and to permit flow of fluid between the reservoir or master cylinder and the secondary system.

Valving means previously proposed for this purpose were not satisfactory because their operation was dependent on mechanical forces (such as a spring) or residual pressure forces from the master cylinder to function. A spring actuated valve is impractical in modern high pressure brake systems because the extremely large and strong valve spring which must be retracted upon release of the brakes and which is usually attached to the brake pedal counteracts the return spring on the pedal. Thus a stronger pedal return spring is needed which in turn requires an operating force which is far in excess of the normal foot pedal pressure requirement.

The other means proposed prior to the present invention depends on the use of the residual pressure in the master cylinder to close the valve and thus isolate the secondary system from the interior of the master cylinder and the reservoir. This proposal requires that a column of fluid be displaced in order to close the valve which causes an undesirable delay in closing. Also, when pressure in the torque responsive brake has been built up to the point sufficient to apply the other brakes, the pressure created in the secondary system tends to open the valve and additional pressure on the foot pedal will be necessary to hold the valve closed, thus defeating the purpose of the power brake system.

To overcome these disadvantages the present invention provides means incorporating a check valve to isolate the secondary torque actuated brake system from the master cylinder reservoir which is not dependent on mechanical or residual fluid pressure to be operative and thus provides a more effective and faster acting control to improve the overall performance of torque actuated power brake systems.

With the foregoing considerations in mind, a principal object of this invention is to provide an improved torque reaction power braking system for a wide variety of vehicles including passenger cars and buses, multi-wheel trucks, tractors and tractor-trailer combinations in which successive brake application is accomplished by torque derived from each preceding brake.

It is another object of the invention to provide a novel braking system for motor vehicles comprising a pedal actuated master cylinder for initially actuating at least one brake and utilizing derived torque to directly actuate the remaining vehicle brakes in which the pedal is operated in the normal manner and with the same feel as in a conventional brake system.

Another object of the invention is the provision in a novel torque reaction power brake system of a set of first brakes preferably located in wheels having the lowest axle weight which incorporate means to transmit the torque and/or servo-action derived therefrom to the remaining vehicle brakes.

Still another object is to provide in a vehicle braking system a primary brake system connected to the master cylinder to directly actuate only one or two of the vehicle brakes, and an independent secondary brake system activated by torque derived from the primary brake system to actuate the remaining vehicle brakes.

A still further object is the provision in novel combination of a first pressure system actuating primary brakes and a second pressure system indirectly activated by derived torque forces from the first pressure system, the systems being independent of each other.

Another object is to provide in novel combination in a vehicle brake system a primary brake having a pressure or other brake actuator and a power cylinder independent of but attached to the brake actuator and so positioned that the torque reaction force of the brake upon activation of the brake actuator is directly transmitted to the power cylinder.

Still another object is the provision in novel combination in a vehicle brake of the internal expanding shoe type of a brake support carrying a brake actuator for the shoes thereon and a power cylinder for powering other brakes, the brake shoes on the support being in contact with both the actuator and the power cylinder.

Another object of the present invention resides in the provisio nof novel master cylinders including mechanisms for automatically isolating the primary and secondary brake systems from each other and from a reservoir upon brake application and for connecting each of said systems to the reservoir when the brakes are released.

Other objects and novel features of invention will become evident or especially be pointed out as the description proceeds with reference to the appended claims and the attached drawings in which:

FIGURES 7, 8 and 9 are central vertical sections of other embodiments of the valve and master cylinder in accordance with the present invention.

Figure 1:
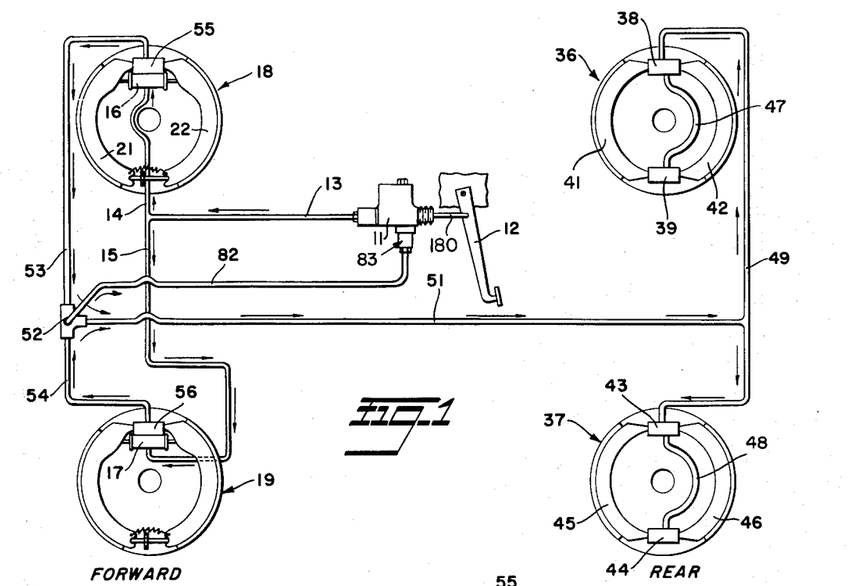
FIGURE 1 is a schematic representation of a vehicle braking system according to a preferred embodiment of the present invention.

With reference to FIGURE 1 the schematic view represents a vehicle hydraulic braking system comprising a master cylinder 11 connected for actuation by a brake pedal 12. A conduit 13 from the master cylinder 11 divides into branch conduits 14 and 15 leading into wheel cylinders 16 and 17, respectively, of the wheel brake assemblies 18 and 19.

Brake assemblies 18 and 19 are in practice associated with the vehicle wheels carrying the lighter load. In the embodiment shown there are mounted on the opposite ends of a forwardly disposed axle (not shown) which may, for example, be the front axle of a four wheel truck. They are surrounded by conventional drums carried by wheels rotatably mounted at the axle ends. A drum is shown partially at 10 in FIG. 2.

Figure 2:
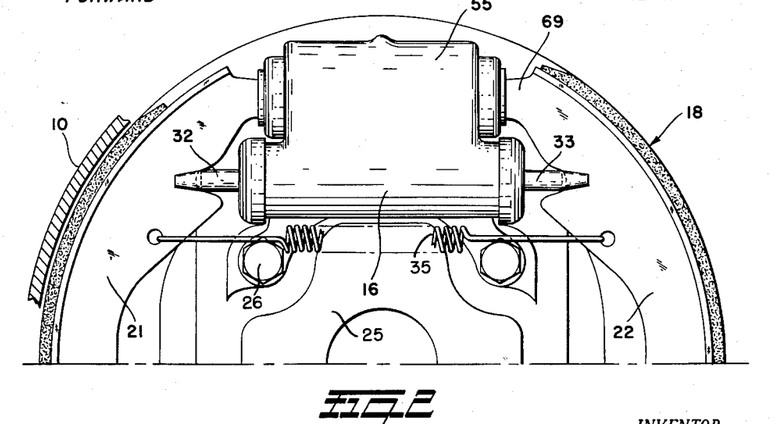
FIGURE 2 is an enlarged elevational view of the upper half of one of the front wheel brakes of the system of FIGURE 1.
Figure 3:
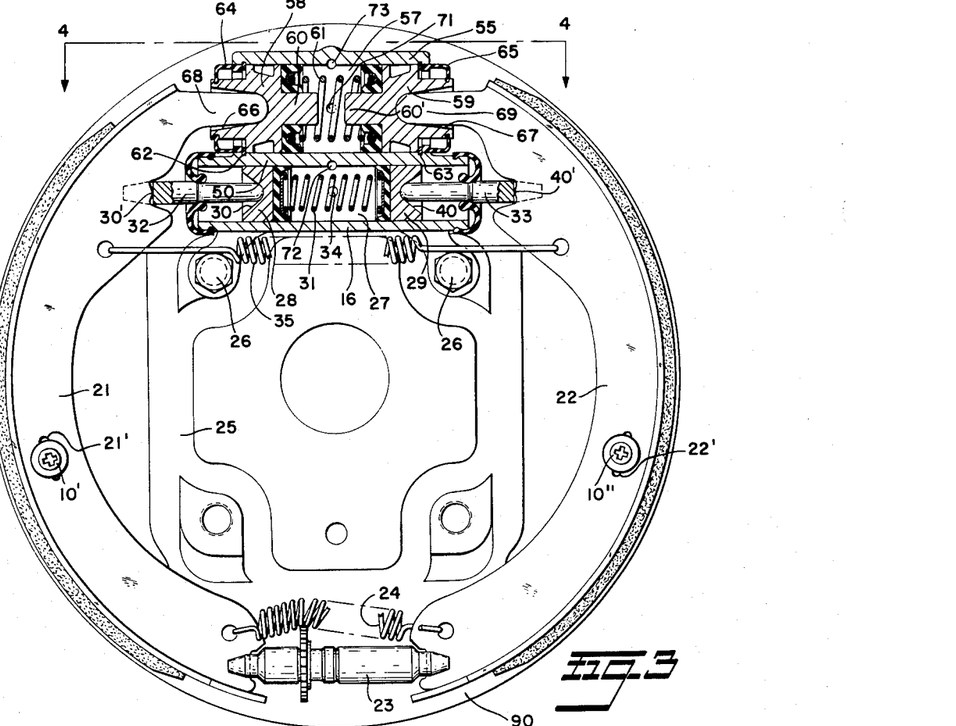
FIGURE 3 is an elevational view of an entire servo brake of FIGURE 2 showing the compound unit with service and power cylinders in section.

As shown in FIGURES 2 and 3, the brake assembly 18 comprises opposed brake shoes 21 and 22 which are coupled by an adjustable floating connection 23 and a tension spring 24. The connection 23 is a longitudinally rigid member pivotally connected at opposite ends to the shoes and is thus supported by and between the shoe lower ends and is extensible in length for brake shoe adjustment, and spring 24 holds it in assembly with the brake shoes.

Figure 4:
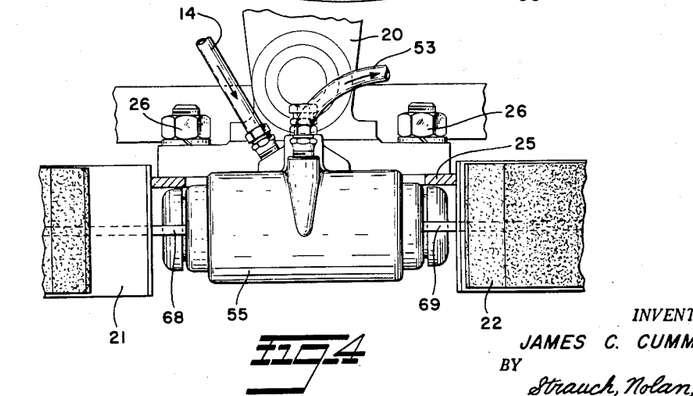
FIGURE 4 is a fragmentary top view substantially on the line 4—4 in FIGURE 3 showing the brake actuators and their mounting on the support plate.

The wheel cylinder 16 is mounted upon a support plate 25 rigid with the axle indicated at 20 in FIGURE 4, as by bolt and nut assemblies shown in FIGURES 3 and 4 at 26. Guide slots 21' and 22' in the respective shoe webs coact with retainer post and fastener assemblies 10' and 10", respectively, carried by the support plate 25 to aid in maintaining the brake shoes in operative association on the support plate while permitting the brake shoes to shift circumferentially.

Wheel cylinder 16 contains a hydraulic chamber 27 disposed between opposed slidable pistons 28 and 29 which are outwardly biased by a compression spring 31 in chamber 27.

Plungers 32 and 33 rockably connect the respective pistons to the adjacent brake shoe ends. Plunger 32 has a rounded inner end rockably interfitting with a socket 30 on piston 28 and a bifurcated outer end embracing a rounded fulcrum 30' on the web of brake shoe 21. Plunger 33 is identical with its inner rounded end rockably interfitting with a socket 40 on piston 29 and a bifurcated outer end embracing a rounded fulcrum 40' on the web of brake shoe 22.

A fluid inlet port 34 enters chamber 27. When pressure is exerted on hydraulic fluid in chamber 27, as when pedal 12 is depressed, pistons 28 and 29 are oppositely displaced to swing brake shoes 21 and 22 outwardly against a relatively rotating drum on the wheel (not shown), and when the pedal 12 is released a return spring 35 between the brake shoes swings them toward each other to drum disengaged position.

The foregoing provides more or less conventional hydraulic brake actuation for front brake assemblies 18 and 19 which are identical in structure, but there is no direct hydraulic pressure connection between the rearward brake assemblies 36 and 37 and the master cylinder 11. The hydraulic circuit directly connected to the master cylinder 11 will be called the primary hydraulic system.

Brake assemblies 36 and 37 may take a number of conventional forms. For example, they may be of the type shown in U.S. Patents 2,751,048 or 3,037,584, single or double acting servo brakes, or disk brakes. It is, however, essential that the secondary brakes be anchored, i.e., that they be so constructed that the braking load on the shoes is transferred to a fixed anchor which is usually the brake support plate. If the secondary brake system includes a series of secondary brakes only the last brakes in the series need be anchored. The intermediate brakes may be the same as the primary brakes.

In the illustrated embodiment the brake assemblies are of the double-ended balanced type with each shoe being suitably anchored in accordance with conventional practice.

Brake assembly 36 comprises a pair of wheel cylinders 38 and 39 acting on the opposite ends of anchored brake shoes 41 and 42 to displace the brake shoes outwardly into engagement with a surrounding rotatable drum (not shown). Brake assembly 37 comprises wheel cylinders 43 and 44 to similarly displace anchored brake shoes 45 and 46 into engagement with a surrounding rotatable drum (not shown). Cylinders 38 and 39 are coupled by a conduit 47 so as to be simultaneously actuatable, and cylinders 43 and 44 are coupled by a conduit 48 so as to be simultaneously actuatable. Cylinders 38, 39, 43 and 44 may be essentially of the expansible type shown at 16 and a conventional set of shoe return springs may be provided at each assembly.

Wheel cylinders 38 and 43 are connected by conduit 49 into which is connected a conduit 51 extending from a T-joint assembly 52. Conduits 53 and 54 lead from T-joint 52 to power cylinders 55 and 56 to forward brake assemblies 18 and 19, respectively. An additional conduit 82 connects conduits 51, 53 and 54 to a check valve assembly 83 or 83', described below, which is connected to master cylinder 11.

As shown in FIGURES 2-4, power cylinder 55 is preferably formed as an integral extension of the housing of wheel cylinder 16 and has a compression chamber 57 wherein are slidably mounted opposed pistons 58 and 59 outwardly biased by compression spring 61. The wheel cylinder 16 and power cylinder 55 in this embodiment are preferably formed as a single unit having a common wall 50 between them. Outward movement of power pistons 58 and 59 is limited by snap ring abutments 62 and 63, and the usual flexible seals 64 and 65 extend between the pistons and the cylinder housing. Inward displacement of pistons 58 and 59 is limited by abutment of central bosses 60 and 60' thereon.

The power actuator pistons have outer sockets 66 and 67, respectively, rockably receiving rounded integral end projections 68 and 69 on the ends of the respective brake shoe webs. An outlet port 71 connects power actuator chamber 57 to conduit 53.

Bleeder valve openings 72 and 73 are provided for the chambers 27 and 57, respectively, normally closed during brake actuation.

The structural coaction of power cylinder 56 and wheel cylinder 17 is the same as above described for power cylinder 55 and wheel cylinder 16.

The hydraulic circuit containing the power cylinders and the conduits leading to the rearward brake assemblies 36 and 37 will be called the secondary hydraulic system.

*Operation*

Operation of the servo power mechanism of FIGURES 1-4 is as follows:

When the brakes are released the primary and secondary hydraulic systems are connected separately to the master cylinder reservoir to assure replenishment of fluid in each system or to permit excess fluid to be returned to the reservoir. Thus, the columns of fluid in both systems are full and solid. When foot pedal 12 is initially depressed the primary and secondary hydraulic systems are each immediately isolated from the reservoir by automatic valve mechanisms described below. In the further movement of the pedal hydraulic pressure will be transmitted through primary conduits 13, 14 and 15 into the forward wheel cylinders 16 and 17. In each wheel cylinder, pistons 28 and 29 will be outwardly displaced which thereby rocks the brake shoes 21 and 22 oppositely outwardly against the rotating brake drum 10. Assuming that front wheel brake drum rotation is counterclockwise (FIGURE 3) upon engagement the rotating brake drum tends to move the brake shoes 21 and 22 along with it in the direction of rotation whereby the trailing shoe 22 is displaced circumferentially toward the power cylinder 55.

As a result of this brake shoe movement, brake shoe 22 displaces power actuator piston 59 inwardly of the power actuator chamber 57 thereby reducing the volume of space between the moving power actuator piston 59 and the stationary power actuator piston 58 which sits against abutment 62. Considerable pressure is thus exerted on the fluid in power actuator chamber 57 and is amplified by the servo action between the brake shoes 21 and 22 due to their floating longitudinally rigid connection at 23 by which the circumferentially directed force of brake shoe 21 is added and directly transferred to brake shoe 22.

During this action, brake shoe 21 effectively pivots about its rocking connection 30' with plunger 32. Also, during this action, pistons 28 and 29 will move, inwardly and outwardly, respective equal amounts thus maintaining the volume between them constant and maintaining a constant pressure in the space. This is important in preserving the "feel" of the pedal and in avoiding additional pedal pressure or additonal pedal travel which would be caused by differential movement of the pistons.

The fluid pressure created in power actuator chamber 57 is transferred through conduits 53, 54, connector 52 and conduts 51 and 49 to the wheel cylinders of rear wheel brake assemblies 36 and 37. These rear brake assemblies 36 and 37 may, for example, be of the type disclosed in said Patent No. 3,037,584 wherein the brake shoes anchor internally of the wheel cylinders (38, 39 and 43, 44) during braking to transmit the braking load to the axle housing. Thus, the rear wheel brakes are applied by reaction forces of the front wheel brake shoes directly and without the intermediate use of reaction plates, levers, cams, etc. In operation the columns of hydraulic liquid in both the primary and secondary systems are full and solid at the time both the front and rear sets of brake shoes are set in frictional engagement with their respective drums and then the increasing pressure applies all at the same time.

Operation of the parts in the front brake assemblies is reversed when the wheels rotate in the opposite direction, with brake shoe 21 serving to displace power actuator piston 58 to generate fluid pressure in the secondary hydraulic system, and operation of the secondary assembly is the same.

Figure 5:
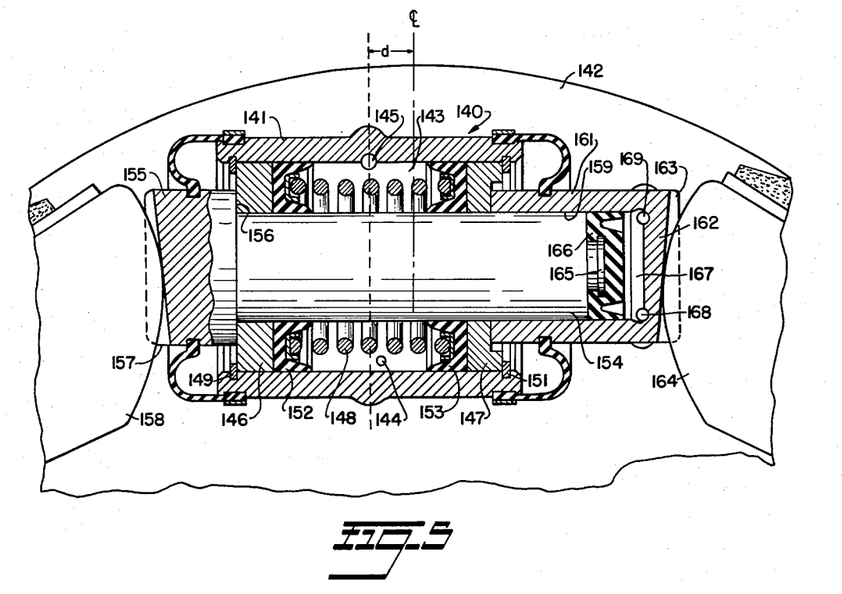
FIGURE 5 is a fragmentary view in section illustrating a further embodiment of the invention utilizing a single cylinder for both service and power operation.

Referring to FIGURE 5, the combined service and power cylinder assembly 140 which may be substituted for the assemblies 16, 55, 17, 56 of FIGURE 1 comprises a housing 141 rigid with the axle mounted spider 142 and enclosing a power or compression chamber 143 having an outlet opening 144 and a bleeder valve opening at 145.

Annular pistons 146 and 147 are slidably mounted in the opposite ends of chamber 143, and they are spring biased by compression spring 148 toward abutment with snap rings 149 and 151. Flexible seals 152 and 153 are interposed between the piston and spring 148.

A cylindrical inner piston 154 projects through chamber 143 passing slidably through the annular pistons and seals, and has an enlarged head 155 providing an inwardly facing annular shoulder 156 for abutment with annular piston 146. The outer end of head 155 is bifurcated at 157 to embrace the web of a brake shoe at 158.

At its other end inner piston 154 slidably enters the bore 159 of a service cylinder 161 having a closed outer end 162 which is bifurcated at 163 to embrace the web of adjacent brake shoe 164.

The lower ends of brake shoes 158 and 164 are rockably connected by a rigid element such as at 23 in FIGURE 3, and the assembly 140 may be used in FIGURE 1 in place of units 16 and 55.

Integral with the reduced end of inner piston 154 is a button 165 carrying a flexible piston cup seal 166, and the space between seal 166 and end wall 162 is the service chamber 167 into which the primary hydraulic fluid from the master cylinder 11 is displaced when pedal 12 is actuated. The primary fluid inlet port is at 168, and a bleeder valve port is at 169.

It will be noted that the chamber 143 is laterally displaced with respect to a vertical centerline through the brake assembly, as by the distance d in FIGURE 5 for a purpose to appear.

The bifurcations at 157 and 163 are inclined, and the associated shoe web ends are arcuate so that relative rocking and vertical sliding may take place during brake operation.

The usual brake return spring or springs extending between shoes 158 and 164 maintain the parts in the position of FIGURE 5 when the brakes are not applied, the inner end of the service cylinder being urged into abutment with annular piston 147.

The FIGURE 5 structure is installed with primary hydraulic circuits 14 and 15 connected into service inlet ports 168 of the respective brake assemblies. When pedal 12 is depressed, the primary and secondary systems are isolated, as before, and thereafter the increasing primary hydraulic pressure in service chamber 167 results in plunger 154 and service cylinder 161 being oppositely displaced to oppositely rock the brake shoes 158 and 164. During this period piston head 155 moves to the left in FIGURE 5 to leave annular piston 146, and service cylinder 161 oppositely leaves annular piston 147, and there is as yet no power actuator action.

However, as soon as the brake shoes engage the rotating brake drum, assuming counterclockwise drum rotation, they will tend to displace the brake shoes circumferentially along with the drum.

The lower ends of the brake shoes being connected by floating unit 23, the force of the primary shoe will be transmitted through the secondary shoe 164 so that service cylinder 161 moves to the left into abutment with piston 147 and thereafter cylinder 161 and annular piston 147 are displaced as a unit to the left in FIGURE 5 to pressurize the fluid in chamber 143 and the secondary hydraulic system connected into outlet 144.

As cylinder 161 is displaced to the left in FIGURE 5 it will be appreciated that plunger 154 moves with it to maintain the fluid pressure in chamber 167 at a constant value.

Since plunger 154 passes slidably through both pistons 146 and 147 which in turn are slidably mounted within the cylindrical surface of chamber 143, there is no rocking or jamming of the associated parts during operation.

The telescoping arrangement of service and actuator cylinder in one unit as in FIGURE 5 provides space and weight saving and lesser manufacturing costs. Basic operation of all the embodiments is identical and one embodiment may be preferred or more desirable than the other depending on application requirements.

The systems of FIGURE 3 and FIGURE 5 can also advantageously be incorporated in a balance dual action brake by providing similar units between both ends of the brake shoes as in the rear brakes illustrated in FIGURE 1.

In order to assure proper and effective functioning of this system, it is necessary to provide a constant predetermined volume of fluid in the secondary system and at the same time allowing excessive fluid upon heat expansion of the fluid to flow back into the reservoir. Furthermore, a means must be provided to allow more fluid to enter the secondary system and be kept therein when the brake shoes of the secondary system are adjusted outwardly due to lining wear thereby increasing the volume in the wheel cylinders. In addition, there must be a means to immediately cut off the hydraulic conduits of the secondary system from the primary system upon brake application.

To this end the secondary system is supplied with fluid through the conduit 82 connected to the master cylinder 11 under the control of a novel valve assembly one embodiment of which will now be described with reference to FIGURE 6.

The master cylinder 11 may be of conventional construction and comprise a housing 170 having a reservoir chamber 172 normally closed by a plug 174 which allows refilling of the reservoir when needed. Immediately below reservoir 172, housing 170 contains a pressure chamber 176 which has a piston 178 mounted for sliding movement therein. Piston 178 is customarily connected to a pushrod 180 which in turn is connected to the foot pedal 12 (FIGURE 1). The pushrod end of pressure chamber 176 may be closed by a bellows 182 secured to housing 170 and pushrod 180 to prevent entry of foreign matter. Piston 178 is normally held in retracted position against a back-up ring 184 by means of a spring 186 seated at one end against a valve 188 at the end of pressure chamber 176 and with its other end abutting a flexible cup 190 on the front end of the piston.

Reservoir 172 and pressure chamber 176 are interconnected by a port 192 and another port 194 of reduced diameter. The midsection of the piston 178 is reduced in diameter to provide an annular chamber 196 behind piston head 198 and communicating with reservoir 172 through port 192. The piston head 198 is provided with a number of axial ports 200 providing unidirectional communication between annular chamber 196 and pressure chamber 176 in front of the piston through flexible cup 190.

The check valve 83 is attached to the master primary conduit 13, which has a nipple 202 extending through an aperture 204 in the upper part of the valve 83, the nipple being provided at its ends with threads to be secured in the threaded outlet aperture 206 of the pressure chamber 176 in the master cylinder 11. Leak proof gaskets 208 and 210 are provided between the fitting 212 and the valve 83 and between the valve and the housing of the master cylinder 11, respectively.

The connector nipple 202 is longitudinally bored as at 214 to provide communication between the pressure chamber 176 and primary conduit 13. The nipple 202 has a reduced diameter portion forming with a radical flange 216 a small pressure chamber 218. A port 220 is provided in this section of the nipple to provide communication between the bore 214 and the pressure chamber 218 for a purpose to appear.

The downwardly extending lower part 222 of the valve 83 is provided with a through bore 224 which intersects the aperture 204. The bore 224 receives a piston or plunger 226 which is urged against the radial flange 216 of the nipple 202 by a coil spring 228 surrounding the lower, recessed portion of the plunger. The other end of the coil spring 228 is supported against the inner end of a fitting 230 screwed into the lower end of the bore 224. The fitting 230 connects the secondary conduit 82 with the interior of the valve 83 and is to this end provided with a port 232 which widens into a bevelled valve seat 234. The tip of the lower, reduced part of the plunger 226 is also bevelled to fit into the bevelled valve seat 234 when the valve is closed and carries a seal 236 to prevent any fluid leakage past the closed valve plunger. The walls of the groove in which the ring seal is received are normal to the bevelled surface of the plunger tip to assure a good sealing contact of the ring and to prevent the seal from being squeezed out, which would happen if the walls of the groove were normal to the axis of the plunger. Thus, the plunger is adapted, when closed, to cut-off the secondary conduit 82 from the interior of the valve.

A fluid chamber 238 around the reduced portion of the plunger 226 is in communication with reservoir 172 through a conduit 240. Thus, in normal position of the apparatus, that is, when no pressure is exterted at the brake pedal, there is direct fluid comunication between the reservoir 172 and the secondary brake system through conduit 240, valve chamber 238, port 232, conduit 82, T-connection 52, branches 53 and 54 and conduits 51 and 49.

It will be noted that no communictaion exists between the interior of the valve 83 and the master cylinder 11. In other words, there is no direct fluid connection between the primary and secondary hydraulic circuits, which is important since intercommunication between the two systems in prior art devices was a known disadvantage and its drawbacks were difficult to overcome.

The valve 83 functions in the following manner. When pressure is applied to the brake pedal 12, the piston 178 is advanced, thereby closing the reservoir port 194, thus establishing a constant volume of fluid in the primary system. Upon further advancement of the piston, fluid pressure is transmitted through bore 214 in the connector nipple to conduit 13 and thence to the wheel cylinders 16 and 17 of the primary brakes. At the same time and prior to reaching the full amount of pressure needed to fully apply the brake shoes 21 and 22, pressure transmitted through port 220 in the connector nipple enters chamber 218 and exerts pressure on the valve plunger 226 displacing it downwardly against the force of the spring 228 into a closed position in the valve seat 234. Thus communication between the secondary system and the reservoir is cut-off assuring a constant volume of fluid available in the secondary system to be acted upon by torque actuated operation of the compression cylinders in the primary brakes upon further advancement of the master cylinder piston to apply the remaining brakes as described above.

It is an important feature of the present invention that the force of the valve coil spring 228 and the volume of the small pressure chamber 218 in the head of the valve are of such proportion that the valve will always be closed prior to complete application of the brake shoes of the primary brakes to the associated brake drums. This is important since if the valve does not close prior to an effective brake application of the primary brakes, the pressure build-up in the secondary system due to the torque actuation would cause fluid to flow back into the reservoir through conduits 82 and 240 with the result that not enough pressure will be available for effective application of the other brakes.

In the present invention, the final holding pressure exerted on the column of fluid within the master cylinder is such that it effectively counteracts the pressure in the secondary system to hold the valve closed.

Upon release of the brakes, that is, upon release of the pressure on brake pedal 12, the valve 83 will be opened only after the brake pedal pressure is reduced to the amount which was necessary to close the valve. Then any excessive fluid in the secondary system may return to the reservoir.

It has already been mentioned that the valve 83 also compensates for wear of the brake linings which causes the brake shoes to move further. When this occurs, a larger column of fluid is necessary to apply the brakes due to the increased volume in the wheel cylinders and this larger column of fluid will consequently be trapped in the secondary system upon each brake application due to the quick response of the valve in closing. Thus, the pressure and piston displacement needed to apply the brakes remains constant.

Figure 7:
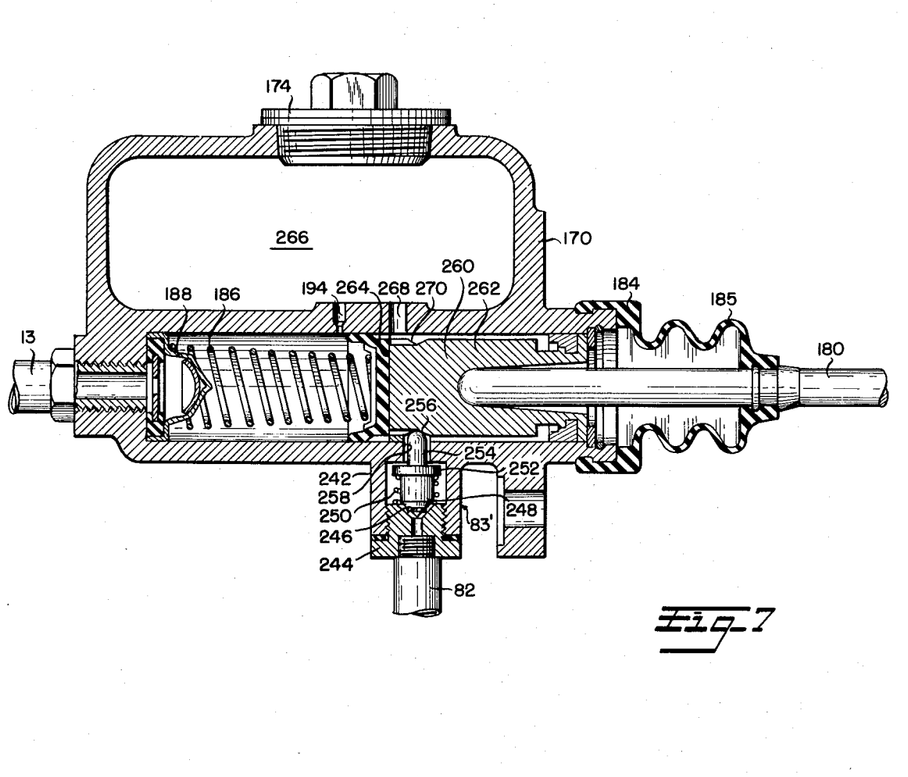

FIGURE 7 illustrates another embodiment of the check valve assembly in which the valve is closed and held closed by mechanical means rather than by hydraulic pressure. In this instance the valve body 242 forms an integral part of the master cylinder housing and extends downwardly therefrom. The valve body is closed at its lower end by a bored fitting 244 screwed into the valve housing for connecting the secondary conduit 82 with the valve. The inner end of the fitting 244 is formed with a bevelled valve seat 246 to receive the bevelled tip of a valve plunger 248 which is normally biased away from the valve seat 246 by a spring 250. The plunger 248 is provided with a flange 252 and a stem 254 of reduced diameter which has a semispherical head 256 for a purpose to appear. The stem 254 normally extends freely through an aperture 258 in the wall of the master cylinder and into the interior thereof opposite the position 260. The piston 260 has a reduced diameter section 262 behind its head 264 to provide fluid communication between the reservoir 266 and the valve 242 through large orifice 268, around piston 260, through aperture 258 past stem 254 into the valve. It will be noted that this fluid is not pressurized and the fluid connection does not hamper the normal function of the master cylinder. The reduced section 262 of the piston 260 also has a radial notch 270 into which the spherical head 256 of the plunger stem 254 extends in the normal, that is, released position of the brake mechanism.

When pressure is applied to the brake pedal 12, piston 260 is advanced thereby pressing stem 254 out of the notch 270 which is accomplished with but little effort since the head 256 of the stem 254 is spherical. Further advance of the piston 260 causes the valve plunger 248 to be depressed downwardly against the force of the spring 250 onto the valve seat 246 and into positive closing engagement therewith, thus disconnecting the conduit 82 from the interior of the valve 242 and consequently from the reservoir 266. It will be noted that upon release of the brake mechanism, the valve will only be opened after complete return of the piston 260. Thus, closing and holding of the valve in this embodiment is positive and mechanical. Otherwise the functioning of the system is identical to that described in connection with FIGURE 6.

The preferred embodiment illustrated in FIGURE 8 is a further variation of the valve structure of FIGURE 7. In this instance the lower end of the valve body 242 is closed by a bored fitting 272 screwed into the valve body and connecting the secondary conduit 82 with the interior of the valve. The flat bottom surface of a counter bore 273 in the fittting 272 supports a coil spring 274 which abuts the underside of a flange 276 on a stem 278. The upperside of the flange 276 is provided with a seal ring 280 adapted to sealingly close the aperture 258 in the wall of the master cylinder. The valve stem 278 extends through aperture 258 and normally abuts the rear of the piston head 198 by means of which the stem is tilted in the released position of the brake mechanism, that is, when the piston 178 is fully retracted. The peripheral surface of the flange 276 is spherical to permit the valve to tilt freely. Tilting of the valve stem 278 causes the seal 280 also to be tilted away from the aperture 258 against the force of the spring 274 thereby opening the aperture and providing free flow communication between the reservoir 266 and the secondary conduit 82.

When pressure is applied to the brake pedal 12, the piston 178 is advanced, receding from the valve stem 278 which then will be forced into an erect position by the spring 274 and the seal ring 280 is pressed against the area surrounding the aperture 258 by spring force to close the aperture and thus cut off the fluid communication between the reservoir and the secondary conduit. Upon release of the brake mechanism, the valve will be opened only after complete return of the piston 178 at which time the piston head 198 starts to tilt the stem 278 opening aperture 258 and thus again establishing fluid communication between the reservoir and the secondary conduit. In this embodiment the valve will be closed and held closed by spring means and hydraulic pressure and opened by mechanical means, Otherwise the functioning of the system is similar to that described in connection with FIGURES 6 and 7.

Figure 6:
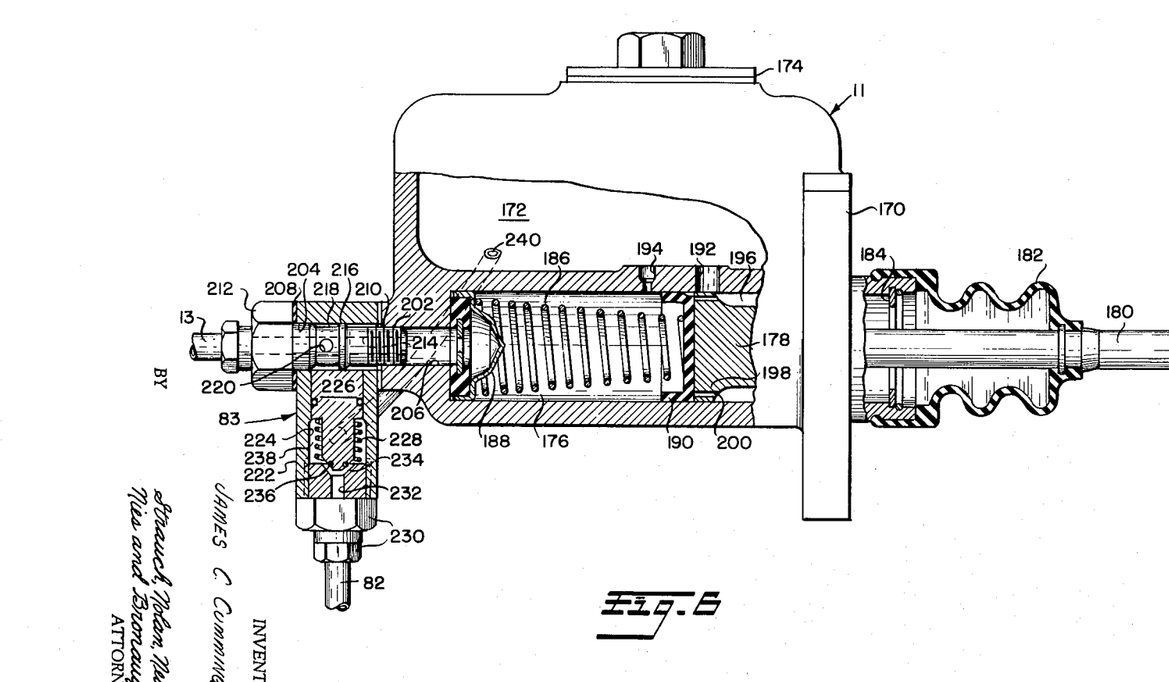
FIGURE 6 is an enlarged view of the master cylinder and check valve assembly partly in section to show interior details.

In the embodiments of FIGURES 6 and 7 the valve actuating parts are proportioned such that in each instance the valve will be closed prior to complete application of the primary brakes.

Figure 9:
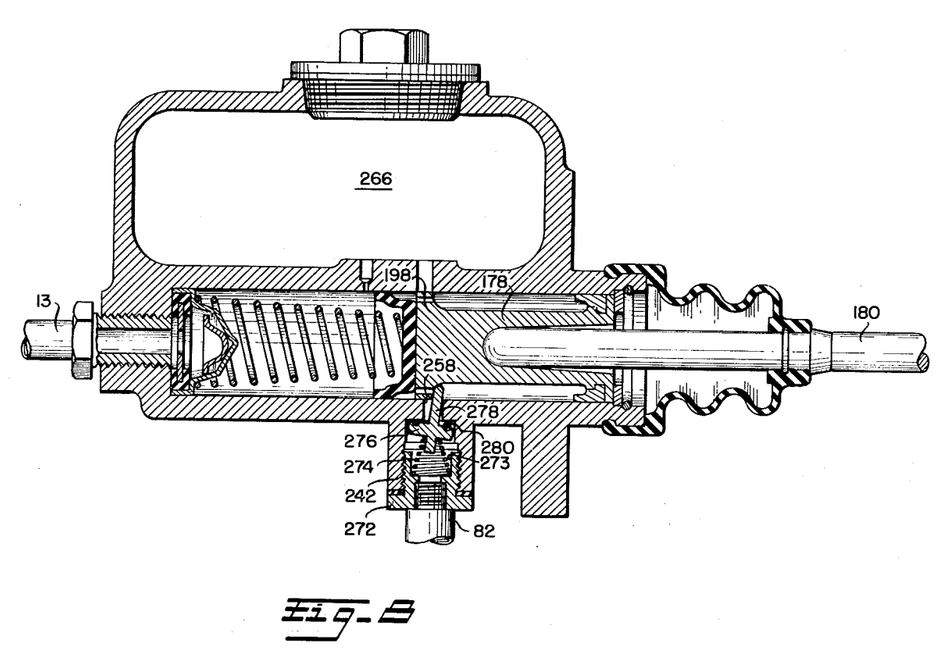

The embodiment illustrated in FIGURE 9 differs from the other three embodiments in that the valve structure is completely incorporated within the master cylinder. To this end, the master cylinder 282 is elongated and its piston 284 is provided with an integral extension 286 divided from the piston proper by an intermediate radial flange 288 which is grooved to receive an O-ring or other type seal 290. The forward section of the flange 288 is provided with a number of bevelled slots 292 for a purpose to appear. The piston chamber 294 of the master cylinder has a reduced inner diameter portion 296 forwardly of the intermediate piston flange 288 in which the piston proper slides. An orifice 297 connected by a fitting (not shown) to the secondary conduit 82 is provided in the wall of the cylinder between intermediate flange 288 and an end flange 302 carrying a seal 304. The piston extension 286 is attached by a link 180 to the brake pedal 12.

In the released position of the brake with the cylinder fully retracted, the front side of the intermediate flange 288 is just at the end of the reduced inner diameter portion 296 whereas the remaining part of the flange including the seal, extends within the large diameter portion 298 of the piston chamber 294. Fluid communication between the reservoir 172 and the secondary conduit 82 is established when the brakes are released through the aperture 300 into the smaller diameter piston chamber portion 296, around piston 284, through the bevelled slots 292 in flange 288, into the larger diameter piston chamber portion 298, around piston extension 286, through orifice 297, into the conduit 82. Upon application of pressure on the brake pedal 12, the piston 284 advances and the sealed flange 288 moves into the smaller diameter portion 296 of the piston chamber and thereby interrupting fluid communication between the smaller diameter portion and the larger diameter portion of the piston chamber. The seal 304, which is also advanced, maintains the volume in the secondary system substantially constant. Consequently, the reservoir is isolated from the secondary conduit 82. Free fluid communication is again restored only upon complete return of the piston 284 when the bevelled slots 292 in the flange 288 allow fluid to pass between chamber portions 296 and 298. This embodiment is advantageous in that no moving valve parts are employed other than the master cylinder piston itself.

Thus, all forms of the present invention provide quick acting valve means to cut off fluid supply to a secondary system in a torque actuated power brake system when the brakes are actuated. This valve means is durable, relatively simple and inexpensive and does not add significantly to the weight of the system or installation time.

It shall be mentioned here that although both front wheels of the vehicle are equipped with the force amplifying brakes as shown in FIGURE 1, it may in certain instances suffice to use only one of such front wheel brakes to actuate the remaining three brakes. In such case in FIGURE 1 one of the brake assemblies 18 or 19 would be like one of the rear brake assemblies and connected into the secondary hydraulic circuit instead of the primary. Also in some applications the force amplifying brake or brakes may be placed in the driven rear wheels, although the front location is preferred especially in regard to heavy-duty commercial vehicles.

Thus, the present invention provides an improved, highly effective power brake mechanism which works on the principle of direct actuation by brake shoe reaction force without the use of intermediate force transferring plates, levers, cams, etc. Furthermore, due to its compact construction and arrangement, no structural difficulties are encountered in the installation of this brake mechanism. A separate secondary system is provided eliminating alteration of the conventional master cylinder.

In the claims the frictional surface rotating with the wheel may be the usual drum for coacting with internally expansible brakes as illustrated, or it may be a disc with correspondingly coacting shoes.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a brake system for a multi-wheel vehicle having at least a pair of forwardly disposed ground engaging wheels and a pair of rearwardly disposed ground engaging wheels, wheel brake assemblies associated with each of said wheels, the brake assemblies associated with at least one of said wheels comprising a pair of brake shoes mounted on a fixed support for limited radial and circumferential movement within a drum rotatable with said ground engaging wheel, a hydraulic service operator mounted on said support and including a pair of oppositely acting pressure applying members operatively connected to one end of said shoes, means including an operator controlled master cylinder in a primary hydraulic circuit for increasing the fluid pressure within said service operator to oppositely displace said members and move said brake shoes to engage said drum, hydraulic actuator means mounted on said support between said shoes so operatively connected directly to said shoes that when said service operator moves said shoes into engagement with said drum, one of said shoes will be displaced circumferentially sufficiently to effect direct operation of said actuator means, means rigidly connecting the opposite ends of said shoes whereby the circumferential movement of said one shoe produces an equal circumferential movement of the other shoe to mantain the spacing between the said members essentially constant during brake application after said shoes engage said drum, a secondary hydraulic circuit independent of said primary hydraulic circuit connected to said master cylinder only when all of said brake assemblies are released and operatively connecting said actuator means to the brake assemblies at the other wheels, said last-mentioned brake assemlies being constructed and arranged to brake said other wheels without producing an increase in the pressure in said secondary hydraulic circuit, and means to isolate said said secondary hydraulic circuit from said master cylinder and from said primary hydraulic circuit when said primary hydraulic circuit is pressurized for brake actuation.

2. In a brake system for a multi-wheel vehicle having at least a pair of forwardly disposed ground engaging wheels and a pair of rearwardly disposed ground engaging wheels, brake applying assemblies at each of said wheels, the wheel brake assemblies associated with at least one of said wheels including a pair of brake shoes mounted for limited radial and circumferential movement on a support within a surrounding rotatable brake drum, a hydraulic service and actuating cylinder assembly comprising a housing having parallel cylindrical bores, a pair of opposed outwardly spring-biased service pistons mounted in one of said bores for free and unrestricted sliding movement therein and having their outer ends formed for rockable connection to adjacent brake shoe ends, a pair of opposed outwardly spring-biased actuator pistons slidably mounted in the other bore and having their outer ends formed for rockable direct connection to said adjacent brake shoe ends, abutment means at the ends of said other bore for arresting outward displacement of said actuator pistons, an operator controlled master cylinder in a primary hydraulic circuit connected to said one bore, fluid supplied through said primary circuit to said one bore urging said service pistons apart to engage said shoes with said drum, said service pistons and said first bore defining a fluid filled space of predetermined size when said brake shoes engage said drum, said brake shoes being shifted circumferentially by said drum when engaged with said drum, a longitudinally rigid member floatingly pivotally connecting the other ends of said brake shoes whereby the circumferential movement of said shoes is effective to displace one of said actuator pistons inwardly to pressurize the fluid between them, said service pistons being displaced, respectively, inwardly and outwardly throughout the full range of circumferential movement of said brake shoes to maintain the fluid filled space between them of constant volume, a secondary hydraulic circuit independent of said primary circuit connecting said other bore to the brake assemblies associated with the other ground engaging wheels, means connecting said secondary circuit to said master cylinder when all of said brakes are released, and means to isolate said secondary hydraulic circuit from said master cylinder and from said primary circuit when said primary circuit is pressurized for brake actuation.

3. In a brake system for a multi-wheel vehicle having at least a pair of forwardly disposed ground engaging wheels and a pair of rearwardly disposed ground engaging wheels, brake applying assemblies at each of said wheels, the wheel brake assemblies associated with at least one of said wheels including a pair of brake shoes mounted for limited radial and circumferential movement on a support within a surrounding rotatable brake drum, a hydraulic service and actuating cylinder assembly comprising a housing having parallel cylindrical bores, a pair of opposed outwardly spring-biased service pistons mounted in one of said bores for free and unrestricted sliding movement therein and having their outer ends formed for rockable connection to adjacent brake shoe ends, a pair of opposed outwardly spring-biased actuator pistons slidably mounted in the other bore and having their outer ends formed for rockable direct connection to said adjacent brake shoe ends, abutment means at the ends of said other bore for arresting outward displacement of said actuator pistons, an operator controlled master cylinder in a primary hydraulic circuit connected to said one bore, fluid supplied through said primary circuit to said one bore urging said service pistons apart to engage said shoes with said drum, said service pistons and said first bore defining a fluid filled space of predetermined size when said brake shoes engage said drum, said brake shoes being shifted circumferentially by said drum when engaged with said drum, a longitudinally rigid member floatingly pivotally connecting the other ends of said brake shoes whereby the circumferential movement of said shoes is effective to displace one of said actuator pistons inwardly to pressurize the fluid between them, said service pistons being displaced, respectively, inwardly and outwardly throughout the full range of circumferential movement of said brake shoes to maintain the fluid filled space between them of constant volume, a secondary hydraulic circuit independent of said primary circuit connecting said other bore to the brake assemblies associated with the other ground engaging wheels, said last mentioned brake assemblies being constructed and arranged to brake said other wheels without producing an increase in the pressure in said secondary hydraulic circuit, means connecting said secondary circuit to said master cylinder when all of said brakes are released, and means to isolate said secondary hydraulic circuit from said master cylinder and from said primary circuit when said primary circuit is pressurized for brake actuation.

4. In a brake system for a multi-wheel vehicle having ground engaging wheels, wheel brake assemblies associated with each of said wheels, the brake assembly associated with at least one of said wheels comprising a pair of brake shoes mounted on a fixed support for limited radial and circumferential movement within a drum rotatable with said one ground engaging wheel, a hydraulic service operator mounted on said support and including a pair of opposed pressure applying members operatively connected to one end of said shoes, means including an operator controlled master cylinder in a primary hydraulic circuit for increasing the fluid pressure within said service operator to oppositely displace said members and thereby move said brake shoes to engage said drum, hydraulic actuator means mounted on said support between said shoes so operatively connected directly to said shoes that when said service operator moves said shoes into engagement with said drum, one of said shoes will be displaced circumferentially sufficiently to effect direct operation of said actuator means, means rigidly connecting the opposite ends of said shoes whereby the circumferential movement of said one shoe produces an equal circumferential movement of the other shoe to maintain the spacing between said members essentially constant during brake application after said shoes engage said drum, a secondary hydraulic circuit independent of said primary hydraulic circuit connected to said master cylinder only when all of said brake assemblies are released and operatively connecting said actuator means to the brake assemblies at the other wheels, said last-mentioned brake assemblies being constructed and arranged to brake said other wheels without producing an increase in the pressure in said secondary hydraulic circuit, and means to isolate said secondary hydraulic circuit from said master cylinder and from said primary hydraulic circuit when said primary hydraulic circuit is pressurized for brake actuation.

5. In a brake system for a multi-wheel vehicle having pairs of ground engaging wheels, brake applying assemblies at each of said wheels, the wheel brake assemblies associated with at least one of said wheels including a pair of brake shoes mounted for limited radial and circumferential movement on a support within a surrounding rotatable brake drum, a hydraulic service and actuating cylinder assembly comprising a housing having parallel bores, a pair of opposed outwardly spring-biased service pistons mounted in one of said bores for free and unrestricted sliding movement therein and having their outer ends formed for rockable connection to adjacent brake shoe ends, a pair of opposed outwardly spring-biased actuator pistons slidably mounted in the other bore and havig their outer ends formed for rockable direct connection to said adjacent brake shoe ends, abutment means at the ends of said other bore for arresting outward displacement of said actuator pistons, an operator controlled master cylinder in a primary hydraulic circuit connected to said one bore, fluid supplied through said primary circuit to said one bore urging said service pistons apart to engage said shoes with said drum, said service pistons and said first bore defining a fluid filled space of predetermined size when said brake shoes engage said drum, said brake shoes being shifted circumferentially by said drum when engaged with said drum, a longitudinally rigid member floatingly pivotally connecting the other ends of said brake shoes whereby the circumferential movement of said shoes is effective to displace one of said actuator pistons inwardly to pressurize the fluid between them, said service pistons being displaced, respectively, inwardly and outwardly throughout the full range of circumferential movement of said brake shoes to maintain the fluid filled space between them of constant volume, a secondary hydraulic circuit independent of said primary circuit connecting said other bore to the brake assemblies associated with the other ground engaging wheels, means connecting said secondary circuit to said master cylinder when all of said brakes are released, and means to isolate said secondary hydraulic circuit from said master cylinder and from said primary circuit when said primary circuit is pressurized for brake actuation.

6. In a brake system for a multi-wheel vehicle having pairs of ground engaging wheels, brake applying assemblies at each of said wheels, the wheel brake assemblies associated with at least one of said wheels including a pair of brake shoes mounted for limited radial and circumferential movement on a support within a surrounding rotatable brake drum, a hydraulic service and actuating cylinder assembly comprising a housing having parallel bores, a pair of opposed outwardly spring-biased service pistons mounted in one of said bores for free and unrestricted sliding movement therein and having their outer ends formed for rockable connection to adjacent brake shoe ends, a pair of opposed outwardly spring-biased actuator pistons slidably mounted in the other bore and having their outer ends formed for rockable direct connection to said adjacent brake shoe ends, abutment means at the ends of said other bore for arresting outward displacement of said actuator pistons, an operator controlled master cylinder in a primary hydraulic circuit connected to said one bore, fluid supplied through said primary circuit to said one bore urging said service pistons apart to engage said shoes with said drum, said service pistons and said first bore defining a fluid filled space of predetermined size when said brake shoes engage said drum, said brake shoes being shifted circumferentially by said drum when engaged with said drum, a longitudinally rigid member floatingly pivotally connecting the other ends of said brake shoes whereby the circumferential movement of said shoes is effective to displace one of said actuator pistons inwardly to pressurize the fluid between them, said service pistons being displaced, respectively, inwardly and outwardly throughout the full range of circumferential movement of said brake shoes to maintain the fluid filled space between them of constant volume, a secondary hydraulic circuit independent of said primary circuit connecting said other bore to the brake assemblies associated with the other ground engaging wheels, said last-mentioned brake assemblies being constructed and arranged to brake said other wheels without producing an increase in the pressure in said secondary hydraulic circuit, means connecting said secondary circuit to said master cylinder when all of said brakes are released, and means to isolate said secondary hydraulic circuit from said master cylinder and from said primary circuit when said primary circuit is pressurized for brake actuation.

7. In a brake system for a multi-wheel vehicle having ground engaging wheels, wheel brake assemblies associated with each of said wheels, the brake assembly associated with at least one of said wheels comprising a pair of brake shoes mounted on a fixed support for limited radial and circumferential movement within a drum rotatable with said ground engaging wheel, a hydraulic service cylinder assembly comprising a housing mounted on said support, said housing having a bore, a pair of opposed outwardly spring-biased service pistons mounted in said bore for free and unrestricted sliding movement therein and having their outer ends formed for rockable connection to adjacent brake shoes ends, an operator controlled master cylinder in a primary hydraulic circuit connected to said bore, fluid supplied through said primary circuit to said bore urging said service pistons apart to engage said shoes with said drum, said service pistons and said first bore defining a fluid filled space of predetermined size when said brake shoes engage said drum, said brake shoes being shifted circumferentially by said drum when engaged with said drum, hydraulic actuator means mounted on said support between said shoes so operatively connected directly to said shoes that when said service operator moves said shoes into engagement with said drum, said shoes will be displaced circumferentially sufficiently to effect direct operation of said actuator means, said service pistons being displaced, respectively, inwardly and outwardly throughout the full range of circumferential movement of said brake shoes to maintain the fluid filled space between them of constant volume, a secondary hydraulic circuit independent of said primary hydraulic circuit connected to said master cylinder only when all of said brake assemblies are released and operatively connecting said actuator means to the brake assemblies at the other wheels, said last-mentioned brake assemblies being constructed and arranged to brake said other wheels without producing an increase in the pressure in said secondary hydraulic circuit, and means to isolate said secondary hydraulic circuit from said master cylinder and from said primary hydraulic circuit when said primary hydraulic circuit is pressurized for brake actuation.

8. In a brake system for a multi-wheel vehicle having pairs of ground engaging wheels, brake applying assemblies at each of said wheels, the wheel brake assemblies associated with at least one of said wheels including a pair of brake shoes mounted for limited radial and circumferential movement on a support within a surrounding rotatable brake drum, a hydraulic service cylinder assembly comprising a housing having a bore, a pair of opposed outwardly spring-biased service pistons mounted in said bore for free and unrestricted sliding movement therein and having their outer ends formed for rockable connection to said brake shoes at one end thereof, hydraulic actuator means mounted on said support between said shoes so operatively connected directly to said shoes that when said service operator moves said shoes into engagement with said drum, one of said shoes will be displaced circumferentially sufficiently to effect direct operation of said actuator means, means rigidly connecting the opposite ends of said shoes whereby the circumferential movement of said one shoe produces an equal circumferential movement of the other shoe to maintain the spacing between said service pistons substantially constant during brake application after said shoes engage said drum, a secondary hydraulic circuit independent of said primary circuit connecting said actuator means to the brake assemblies associated with the other ground engaging wheels, said last-mentioned brake assemblies being constructed and arranged to brake said other wheels without producing an increase in the pressure in said secondary hydraulic circuit, means connecting said secondary circuit to said master cylinder when all of said brakes are released, and means to isolate said secondary hydraulic circuit from said master cylinder and from said primary circuit when said primary circuit is pressurized for brake actuation.

References Cited by the Examiner
UNITED STATES PATENTS 2,115,230   4/1938   Oliver _____________ 188—152
2,385,812   10/1945  Hoyt ______________ 188—152

MILTON BUCHLER, *Primary Examiner.*

G. HALVOSA, *Assistant Examiner.*